(12) United States Patent
Cao et al.

(10) Patent No.: US 8,895,937 B2
(45) Date of Patent: Nov. 25, 2014

(54) CONVERTOR FOR X-RAY RADIOGRAPHY AND ITS MANUFACTURING METHOD AND AN X-RAY DETECTOR

(75) Inventors: Dian Song Cao, Beijing (CN); Lei Cao, Beijing (CN); Guang Wei Du, Beijing (CN); Li Rong Ren, Beijing (CN); Xiao Dong Xu, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 164 days.

(21) Appl. No.: 13/498,693

(22) PCT Filed: Sep. 16, 2010

(86) PCT No.: PCT/EP2010/063599
§ 371 (c)(1), (2), (4) Date: Apr. 27, 2012

(87) PCT Pub. No.: WO2011/036084
PCT Pub. Date: Mar. 31, 2011

(65) Prior Publication Data
US 2012/0201346 A1    Aug. 9, 2012

(30) Foreign Application Priority Data
Sep. 28, 2009   (CN) .......................... 2009 1 0177248

(51) Int. Cl.
*G01T 1/20* (2006.01)
*G01N 23/06* (2006.01)
(52) U.S. Cl.
CPC .................................... *G01T 1/2002* (2013.01)
USPC ........................................ 250/370.11; 378/53
(58) Field of Classification Search
USPC ........................................ 250/370.11; 378/53
See application file for complete search history.

(56) References Cited

U.S. PATENT DOCUMENTS 7,194,174 B2 * 3/2007 Dridi et al. .................... 385/129
7,315,027 B2   1/2008 Okada et al. ............. 250/370.11
(Continued)

FOREIGN PATENT DOCUMENTS

CN       1809762 A    7/2006 ................ G01T 1/20
CN     101257077 A    9/2008 .............. H01L 33/00
(Continued)

OTHER PUBLICATIONS

International Search Report and Written Opinion, Application No. PCT/EP2010/063599, 16 pages, Nov. 30, 2011.
(Continued)

*Primary Examiner* — David Porta
*Assistant Examiner* — Mindy Vu
(74) *Attorney, Agent, or Firm* — King & Spalding L.L.P.

(57) ABSTRACT

The present disclosure provides a convertor for X-ray radiography and its manufacturing method and an X-ray detector, wherein the surface of the scintillator facing the X-ray is covered with photonic crystals of a two-dimensional or three-dimensional spatial structure capable of reflecting the visible light facing the photonic crystals generated by the scintillator to increase the intensity of the output light of the scintillator by more than 100%, thus enhancing the image brightness and improving the image resolution, in addition to reducing to a certain extent the interference between pixels due to the ability of the photonic crystals to control the direction of the light being reflected, for example, by controlling the reflecting direction so as to be vertical to the surface of the scintillator, and the manufacturing method and material for the photonic crystals are low in cost without toxicity, enabling it to be used more widely.

10 Claims, 2 Drawing Sheets

(56) References Cited

U.S. PATENT DOCUMENTS

| | | | |
|---|---|---|---|
| 2005/0167605 A1 | 8/2005 | Juni | 250/370.11 |
| 2006/0120679 A1* | 6/2006 | Hyde | 385/129 |
| 2006/0131509 A1* | 6/2006 | Matz et al. | 250/370.11 |
| 2008/0089642 A1 | 4/2008 | Grot et al. | 385/31 |

FOREIGN PATENT DOCUMENTS

| | | | |
|---|---|---|---|
| WO | 03/034113 A2 | 4/2003 | G02B 6/122 |
| WO | 2011/036084 A2 | 3/2011 | G01T 1/20 |

OTHER PUBLICATIONS

Chinese Office Action, Application No. 200910177248, 16 pages (w/English translation), Feb. 29, 2012.

Chinese Office Action, Application No. 200910177248, 19 pages (w/English translation), Jan. 14, 2013.

Chinese Office Action, Application No. 200910177248, 17 pages (w/English translation), Aug. 11, 2013.

* cited by examiner

CONVERTOR FOR X-RAY RADIOGRAPHY AND ITS MANUFACTURING METHOD AND AN X-RAY DETECTOR

CROSS-REFERENCE TO RELATED APPLICATIONS

This application is a U.S. National Stage Application of International Application No. PCT/EP2010/063599 filed Sep. 16, 2010, which designates the United States of America, and claims priority to CN Patent Application No. 200910177248.4 filed Sep. 28, 2009. The contents of which are hereby incorporated by reference in their entirety.

TECHNICAL FIELD

The present disclosure relates to X-ray imaging technology, and more particularly to a convertor for X-ray radiography and its manufacturing method and an X-ray detector.

BACKGROUND

X-ray is widely used in various fields such as high-resolution medical imaging which includes digital angiography and X-ray tomography especially for bone density testing, portal imaging in radiotherapy and other non-destructive testing techniques using X-ray. As X-ray has negative effects on the health of the tested subjects, X-ray used for medical imaging is relatively weak in strength. How to quickly obtain high-resolution and low interference images with a relatively weak X-ray has become a highly desirable goal in the field.

As shown in FIG. 1, most X-ray detectors have two major parts: a convertor and an imaging apparatus. In the detectors currently available, the convertor is composed of a scintillator. During X-ray testing, the X-ray passes through the tested subject and hits the surface of the scintillator which absorbs the X-ray and generates the visible light. The imaging apparatus then takes images using the detected visible light. The media for imaging can be film, display or digital media.

The scintillator is usually made of rare-earth metal oxides such as $Gd_2O_2S$ and CsI etc. After passing through the tested subject during the test, different beams of X-ray change their direction and hit the scintillator at different incident angles. The scattering and diffraction of the X-ray beams will result in lower photon flux. In addition, unparallel neighboring X-ray beams will cause interference between neighboring pixels of the finished image. All these factors combined will lower the MTF (Modulation Transfer Function) and DQE (Detective Quantum Efficiency) of the detector. MTF can characterize the image resolution and DQE can characterize the extent of interference between pixels.

At present, using new semiconductor materials to make the convertor is a way to improve the resolution and reduce the inter-pixel interference of the X-ray detector. One such new semiconductor material is CdSe which is able to directly convert X-ray to electronic signals, thus greatly improving the MTF and DQE of the convertor. However, this new semiconductor material is toxic and expensive, which limits its use.

SUMMARY

In one embodiment, a convertor for X-ray radiography includes a scintillator and photonic crystals, wherein said photonic crystals are of a two-dimensional or three-dimensional spatial structure and cover the surface of said scintillator facing the X-ray.

In a further embodiment, said photonic crystals are composed of a first material which constitutes the crystal lattices in periodic arrangement and a second material which fills the cavities in the crystal lattices; wherein said first material and second material are of a two-dimensional or three-dimensional spatial structure and the refractive index difference between the first material and second material meets the predefined difference value condition. In a further embodiment, said predefined difference value condition is that the refractive index difference is in the range of 0.01 to 2. In a further embodiment, the spatial structure and energy band gap of said photonic crystals enable said photonic crystals to reflect the visible light facing the photonic crystals generated by said scintillator and to control the reflection direction. In a further embodiment, said photonic crystals are spirally applied to coat the surface of said scintillator facing the X-ray, or said photonic crystals are sprayed to coat the surface of said scintillator facing the X-ray, or said photonic crystals are deposited in solution to cover the surface of said scintillator facing the X-ray.

In another embodiment, an X-ray detector includes a convertor and an imaging apparatus, wherein the convertor includes a scintillator and photonic crystals that are of a two-dimensional or three-dimensional spatial structure and cover the surface of said scintillator facing the X-ray, and wherein the imaging apparatus is used for taking images utilizing the visible light emanating from said convertor. In a further embodiment, the sensor array in said imaging apparatus faces the fluorescence material of cylindrical structure covering the surface of the scintillator.

In another embodiment, a method for producing a convertor for X-ray radiography includes coating the surface of the scintillator facing the X-ray with the photonic crystals of a two-dimensional or three-dimensional spatial structure.

In a further embodiment, the method uses a first material of a two-dimensional or three-dimensional spatial structure to form the crystal lattice of periodic arrangement and a second material of a two-dimensional or three-dimensional spatial structure to fill the cavities of said lattice, hence forming said photonic crystals; wherein the refractive index difference between the first material and the second material meets the predefined difference value condition. In a further embodiment, said predefined difference value condition is that the refractive index difference is in the range of 0.01 to 2. In a further embodiment, the photonic crystals can be manipulated to reflect the visible light facing the photonic crystals generated by said scintillator with a controllable direction by adjusting the arrangement pattern of said first material and second material and the energy band gap of said photonic crystals. In a further embodiment, said photonic crystals are spirally applied to coat the surface of said scintillator facing the X-ray, or said photonic crystals are sprayed to coat the surface of said scintillator facing the X-ray, or said photonic crystals are deposited in solution to cover the surface of said scintillator facing the X-ray.

BRIEF DESCRIPTION OF THE DRAWINGS

Example embodiments will be explained in more detail below with reference to figures, in which.

DETAILED DESCRIPTION

Figure 1:
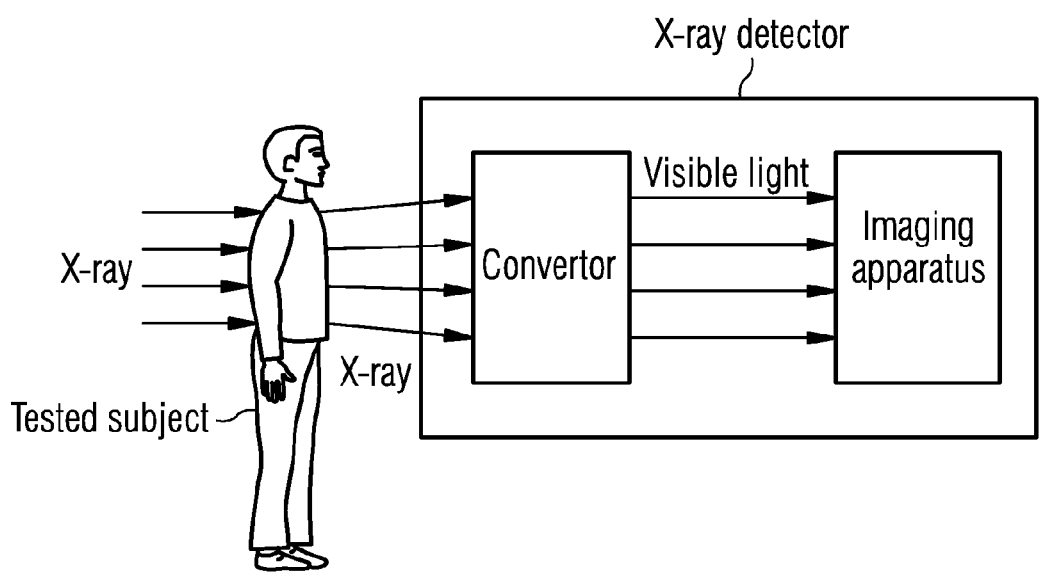
FIG. 1 is a schematic diagram showing the composition of a conventional X-ray detector.

Some embodiments provide technology for improving image resolution and reducing inter-pixel interference. Therefore a convertor for X-ray imaging and an X-ray detector are provided, wherein the convertor is suitable for wide use.

Some embodiments provide a convertor for X-ray radiography, where the convertor includes a scintillator and photonic crystals; wherein said photonic crystals are of a two-dimensional or three-dimensional spatial structure and cover the surface of the scintillator facing the X-ray. In some embodiments, the photonic crystals are composed of a first material which constitutes the crystal lattices in periodic arrangement, and a second material which is used to fill the cavities in the crystal lattices; wherein said first material and second material are of a two-dimensional or three-dimensional spatial structure, and the refractive index difference between the first material and second material meets a predefined difference value condition.

In some embodiments, said predefined difference value condition is that the refractive index difference is in the range of 0.01 to 2. The spatial structure and energy band gap of said photonic crystals may enable said photonic crystals to reflect the visible light facing photonic crystals generated by said scintillator and to control the reflection direction. In this case, said photonic crystals may be spirally applied to coat the surface of said scintillator facing the X-ray, or said photonic crystals are sprayed to coat the surface of said scintillator facing the X-ray, or said photonic crystals are deposited in solution to cover the surface of said scintillator facing the X-ray.

Some embodiments provide an X-ray detector which comprises said convertor and an imaging apparatus; wherein said imaging apparatus is used to take images utilizing the visible light emanating from said convertor. The sensor array in said imaging apparatus faces the fluorescence material of cylindrical structure covering the surface of the scintillator.

Some embodiments provide a method for producing the convertor for X-ray radiography, which includes: coating the surface of the scintillator facing the X-ray with the photonic crystals of a two-dimensional or three-dimensional spatial structure. Specifically, a first material of two-dimensional or three-dimensional spatial structure is used to form the crystal lattices in periodic arrangement and a second material of two-dimensional or three-dimensional spatial structure is used to fill the cavities in said crystal lattices to form said photonic crystals; wherein the refractive index difference between the first material and second material meets the predefined difference value condition.

Preferably, said predefined difference value condition is that the refractive index difference is in the range of 0.01 to 2. The photonic crystals can be manipulated to reflect the visible light facing the photonic crystals generated by said scintillator with a controllable direction by controlling the arrangement pattern of said first material and second material and the energy band gap of said photonic crystals. Specifically, said photonic crystals can be spirally applied to coat the surface of said scintillator facing the X-ray, or said photonic crystals are sprayed to coat the surface of said scintillator facing the X-ray, or said photonic crystals are deposited in solution to cover the surface of said scintillator facing the X-ray.

From the above description, we can see that the surface of the scintillator facing the X-ray is coated with photonic crystals of a two-dimensional or three dimensional spatial structure. The photonic crystals can reflect the visible light facing them. By reflecting the visible light emanating from the scintillator, the photonic crystals can improve the intensity of the output light of the scintillator by more than 100%, thus enhancing the image brightness and improving the image resolution.

More preferably, in addition to manipulating the photonic crystals to reflect the visible light facing the photonic crystals generated by the scintillator, it is also possible to control the direction of the light being reflected, for example, controlling the direction so as to be vertical to the surface of the scintillator, by adjusting the spatial structure and energy band gap of the photonic crystals, thus improving the resolution of the finished image and also reducing the inter-pixel interference to some extent. The manufacturing method and materials for phonotic crystals are low in cost without toxicity, enabling it to be used widely.

To improve the MTF and DQE of the convertor of the X-ray detector i.e. the efficiency of the scintillator in generating visible light, the surface of the scintillator facing the X-ray may be coated with photonic crystals of a spatial structure with at least two dimensions. In addition to manipulating the photonic crystals to reflect the visible light generated by the scintillator, it may also be possible to control the direction of the light being reflected by adjusting the spatial structure and energy band gap of the photonic crystals. For example, if the energy band gap of the photonic crystals matches that of the visible light generated by the scintillator, the spatial structure of the photonic crystals can be adjusted so that the visible light facing the photonic crystals is reflected to the direction vertical to the surface of the scintillator. In other words, the photonic crystals can reflect the visible light generated by the scintillator with the absorbed X-ray so that this portion of the visible light which would otherwise not be transmitted to the imaging apparatus can be transmitted to the imaging apparatus, thus enhancing the intensity of the visible light going to the imaging apparatus by more than 100%.

Figure 2:
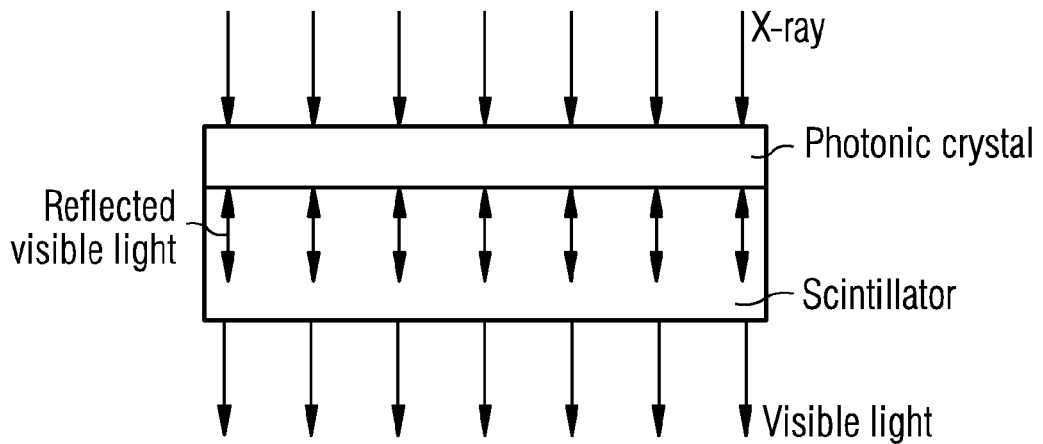
FIG. 2 is a schematic diagram showing an example convertor according to one embodiment of the present disclosure.

FIG. 2 is a schematic diagram of an example convertor provided in one embodiment. As shown in FIG. 2, the convertor includes a scintillator and photonic crystals coated on the surface of the scintillator facing the X-ray, wherein the photonic crystals are of a two-dimensional or three-dimensional spatial structure, and more visible light is transmitted to the imaging apparatus through the reflection of the visible light by the photonic crystals.

As the photonic crystal is a crystal of periodic dielectric structure, the periodic arrangement of the atoms within the crystals results in energy bands, and the gap between the energy bands is called an energy band gap. The electromagnetic wave falling in the energy band gap will not be propagated. Based on this theory, it was discovered that the brightness of the visible light transmitted to the imaging apparatus can be enhanced by using photonic crystals, whose energy band gap matches the frequency of the visible light generated by the scintillator, to reflect the visible light emitted form the scintillator.

If the periodic structure of the photonic crystals exists in one direction only, the energy band gap can exist only in the same direction. Similarly, if the periodic structure of the photonic crystals exists in two or three directions, the energy band gap can exist in more directions, allowing flexibility in adjusting the direction of the visible light being transmitted to the surface of the photonic crystals.

Specifically, two materials with different refractive indices can be used to form the photonic crystals having a periodic spatial structure. The photonic crystals used in certain embodiments can be composed of two materials of two-dimensional or three dimensional spatial structure. The first material constitutes the crystal lattices in periodic arrangement and the second material is used to fill the cavities in the crystal lattices formed by the first material. The refractive index difference between the first material and second material meets the predefined difference value condition. It is preferable that the refractive index difference between the two materials used is relatively large. For example, the predefined difference value condition is that the refractive index difference can be in the range of 0.01 to 2.

In addition, it is possible to adjust the frequency range with the energy band gap effects produced by the photonic crystals by adjusting the positions of the cavities to be filled with the second material so that the energy band gap blocks the transmission of electromagnetic waves whose frequencies fall in such frequency range. In some embodiments, reflection of the visible light is realized by adjusting the energy band gaps of the photonic crystals to match the frequency of the visible light generated by the scintillator.

Furthermore, in some embodiments, it is possible to control the reflecting direction of the visible light generated by the scintillator by adjusting the periodic structure of the photonic crystals, that is, by adjusting the arrangement pattern of the two materials with different refractive indices. Most preferably, the visible light being reflected by the photonic crystals is vertical to the surface of the scintillator. This can reduce the interference between X-rays (i.e. the inter-pixel interference in the finished images) as well as enhancing the output strength of the visible light.

In this case, the first material and the second material include but are not limited to the following materials: titanium oxides such as $TiO_2$, silicon oxides such as $SiO_2$, zinc oxides such as ZnO and polymers such as polythene, polypropylene and polystyrene.

Said photonic crystals may be coated onto the surface of the scintillator by solution depositing method, or the photonic crystals are coated onto the surface of the scintillator by spiral application or the photonic crystals are coated onto the surface of the scintillator by spraying. In the convertor shown in FIG. 2, the scintillator can be made by using compounds of rare earth metals such as $Gd_2O_2S$ and CsI.

Figure 3:
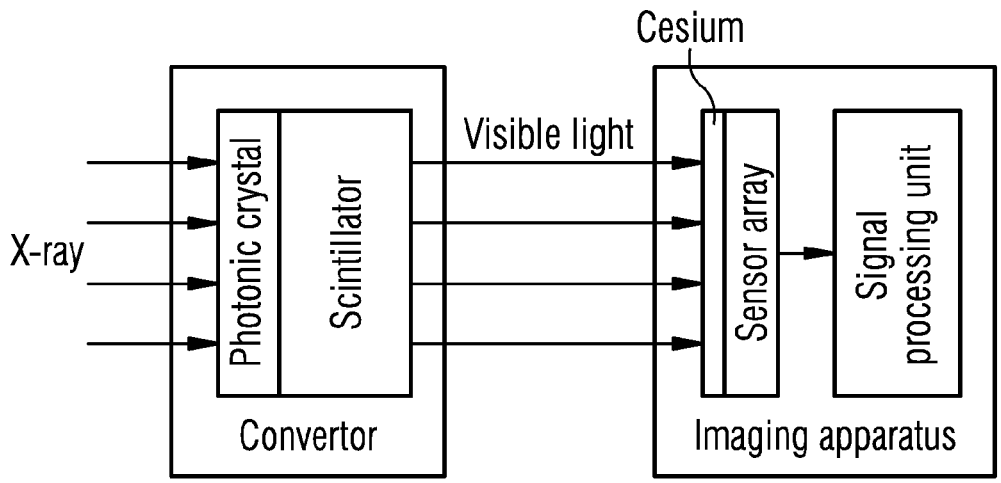
FIG. 3 is a schematic diagram showing the composition of an example X-ray detector according to one embodiment of the present disclosure.

FIG. 3 is a schematic diagram of an example X-ray detector provided in one embodiment, wherein the convertor shown in FIG. 2 is used, and the imaging can be achieved using the available techniques with any media selected from film, display and digital media.

Digital imaging has become more and more popular due to its advantages of storage convenience, ease of obtaining dynamic image data, ability to quickly capture images and grey scale adjustment. For example, it can be widely used in angiography and heart imaging. A brief description of the imaging apparatus is given below using digital imaging as an example.

The imaging apparatus using digital imaging technology may comprise sensor arrays and signal processing unit. The sensor arrays are used to capture the visible light emanating from the scintillator and convert the visible light to an electronic signal. The conversion is made by arrays and each array may be corresponding to a pixel in the finished image. The signal processing unit processes the electronic signal output from the sensor arrays including signal amplification and A/D conversion before outputting the final image data. This may be achieved in the same way as in existing imaging apparatuses. However, unlike in existing imaging apparatuses, the surface of the sensor arrays facing the scintillator may be coated with fluorescence material of a cylindrical structure such as cesium. This coating of fluorescence material will produce the light pillar effects on the visible light transmitted from the scintillator, which may prevent or reduce the scattering and reflecting of the visible light by the sensor arrays, thus improving the sensitization efficiency of the sensor arrays, which in turn may further improve the resolution of the finished image. This method may also be suitable for the imaging apparatuses using CRT displays as the imaging media.

From the above description, we can see that the methods and devices provide herein may provide one or more of the following benefits:

1) The surface of the scintillator facing the X-ray is coated with photonic crystals of a two-dimensional or three dimensional spatial structure. By reflecting the visible light generated by the scintillator, the photonic crystals can improve the strength of the visible light fed to the imaging apparatus by more than 100%, thus enhancing the image brightness and improving the image resolution.

2) It is possible to manipulate the photonic crystals to reflect the visible light facing the photonic crystals generated by the scintillator and to control the direction of the light reflected, for example, controlling the reflection direction so as to be vertical to the surface of the scintillator, thus enhancing the strength of the light in the vertical direction, by adjusting the spatial structure and energy band gap of the photonic crystals. This will improve the resolution of the finished image while reducing the inter-pixel interference to some extent, and the manufacturing cost of the photonic crystal is low and the material used is inexpensive and non-toxic, thus suitable for wide use.

3) The surface of the sensor arrays in the imaging apparatus is coated with the fluorescence material of a cylindrical structure. This coating of fluorescence material will have the light pillar effects on the visible light transmitted from the scintillator, which prevents the scattering and reflecting of the visible light by the sensor arrays, thus improving the resolution of the finished image.

4) Some embodiments can achieve good results with little change to the device on the existing X-ray detector, and are easy to implement.

The above are only preferred or example embodiments invention and are not intended to limit the present invention. Any modifications, substitutions and improvements without departure from the spirit and principle of the present invention should be included in the protective scope of this invention.

The invention claimed is:

1. A convertor for X-ray radiography, comprising:
  a scintillator having an input surface facing an X-ray source and an opposite output surface facing a sensor array, the scintillator configured to convert X-ray radiation from the X-ray source into visible light having a particular frequency; and
  photonic crystals covering the input surface of the scintillator facing the X-ray source;
  wherein said photonic crystals have a two-dimensional or three-dimensional spatial structure;
  wherein said photonic crystals comprise a first material forming the crystal lattices defining cavities in periodic arrangement and a second material that fills the cavities defined by the crystal lattices;
  wherein said first material and second material have a two-dimensional or three-dimensional spatial structure and a refractive index difference between the first material and the second material meets a predefined difference value condition;

wherein the positions of the cavities filled with the second material are selected to provide energy band gaps that match the particular frequency of visible light generated by the scintillator, such that the photonic crystals are configured to reflect the visible light generated by the scintillator; and wherein the positions of the cavities filled with the second material are further selected to define a reflecting direction of the visible light generated by the scintillator that is perpendicular to the input surface of the scintillator.

2. The converter of claim 1, wherein said predefined difference value condition is that the refractive index difference is in the range of 0.01 to 2.

3. The converter of claim 1, wherein said photonic crystals are either (a) spirally applied to coat the surface of said scintillator facing the X-ray, (b) sprayed to coat the surface of said scintillator facing the X-ray, or (c) deposited in solution to cover the surface of said scintillator facing the X-ray.

4. The convertor of claim 1, wherein said photonic crystals are capable of reflecting visible light facing the photonic crystals generated by the scintillator to increase an output light intensity of the scintillator by more than 100%.

5. An X-ray detector comprising:
a convertor including:
a scintillator having an input surface facing an X-ray source and an opposite output surface facing a sensor array, the scintillator configured to convert X-ray radiation from the X-ray source into visible light having a particular frequency; and
photonic crystals covering the input surface of the scintillator facing the X-ray source;
wherein said photonic crystals have a two-dimensional or three-dimensional spatial structure;
wherein said photonic crystals comprise a first material forming the crystal lattices defining cavities in periodic arrangement and a second material that fills the cavities defined by the crystal lattices;
wherein said first material and second material have a two-dimensional or three-dimensional spatial structure and a refractive index difference between the first material and the second material meets a predefined difference value condition;
wherein the positions of the cavities filled with the second material are selected to provide energy band gaps that match the particular frequency of visible light generated by the scintillator, such that the photonic crystals are configured to reflect the visible light generated by the scintillator; and wherein the positions of the cavities filled with the second material are further selected to define a reflecting direction of the visible light generated by the scintillator that is perpendicular to the input surface of the scintillator;
an imaging apparatus configured for taking images utilizing visible light emanating from said convertor.

6. The X-ray detector of claim 5 wherein a sensor array of the imaging apparatus faces a fluorescence material having a cylindrical structure covering a surface of the scintillator.

7. The X-ray detector of claim 5, wherein said predefined difference value condition is that the refractive index difference is in the range of 0.01 to 2.

8. A method for producing a convertor for X-ray radiography, comprising:
coating a surface of a scintillator, which scintillator is configured to convert X-ray radiation into visible light having a particular frequency, with photonic crystals having a two-dimensional or three-dimensional spatial structure;
wherein said photonic crystals comprise a first material forming the crystal lattices defining cavities in periodic arrangement and a second material that fills the cavities defined by the crystal lattices;
wherein said first material and second material have a two-dimensional or three-dimensional spatial structure and a refractive index difference between the first material and the second material meets a predefined difference value condition;
wherein the positions of the cavities filled with the second material are selected to provide energy band gaps that match the particular frequency of visible light generated by the scintillator, such that the photonic crystals are configured to reflect the visible light generated by the scintillator; and
wherein the positions of the cavities filled with the second material are further selected to define a reflecting direction of the visible light generated by the scintillator that is perpendicular to the surface of the scintillator covered by the photonic crystals.

9. The method of claim 8, wherein said predefined difference value condition is that the refractive index difference is in the range of 0.01 to 2.

10. The method of claim 8, comprising applying said photonic crystals by (a) spirally applying said photonic crystals to coat the surface of said scintillator facing the X-ray, (b) spraying said photonic crystals to coal the surface of said scintillator facing the X-ray, or c) depositing said photonic crystals in solution to cover the surface of said scintillator facing the X-ray.

* * * * *